July 8, 1958 J. J. MARTIN 2,842,076
APPARATUS FOR DISTRIBUTING COMBUSTION AIR INTO
DIFFERENT COMBUSTION ZONES OF A FURNACE
Filed Feb. 5, 1953 2 Sheets-Sheet 1
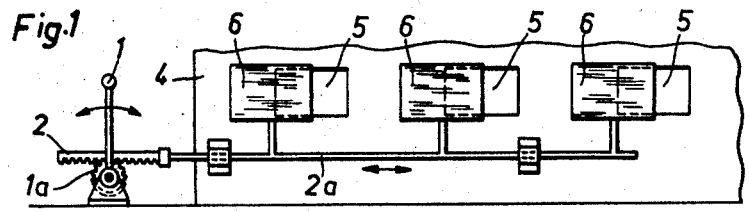
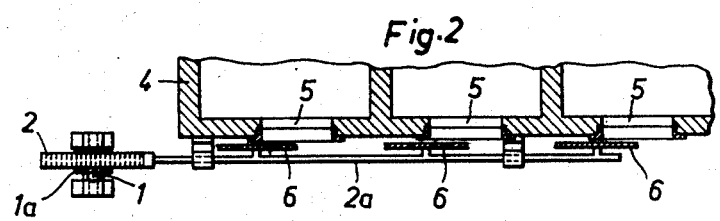
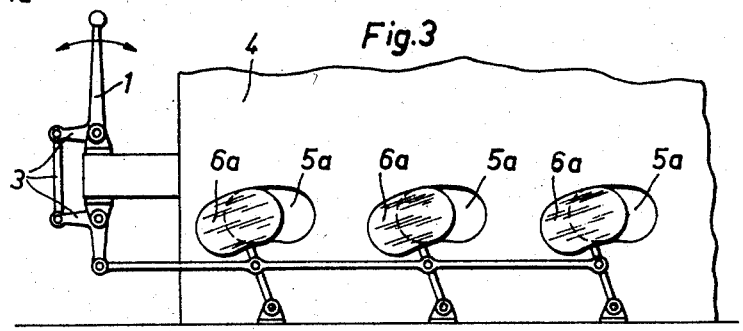
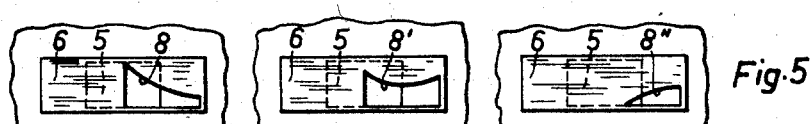
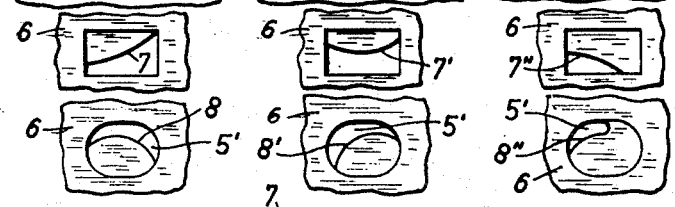
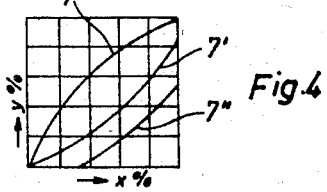
INVENTOR
JOHANNES JOSEF MARTIN.
BY K. A. Mayr
ATTORNEY

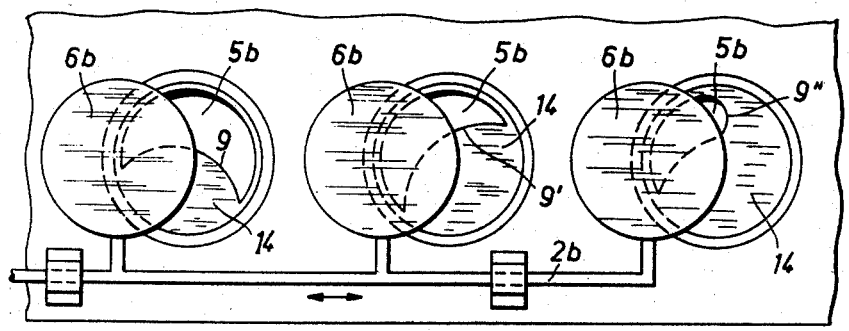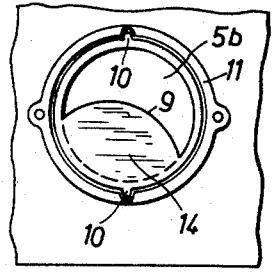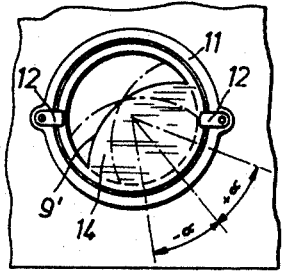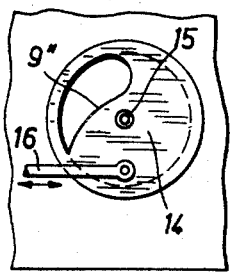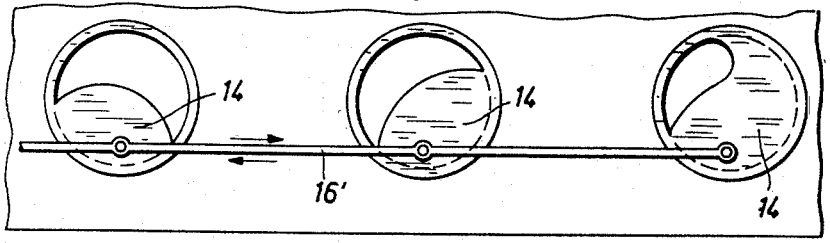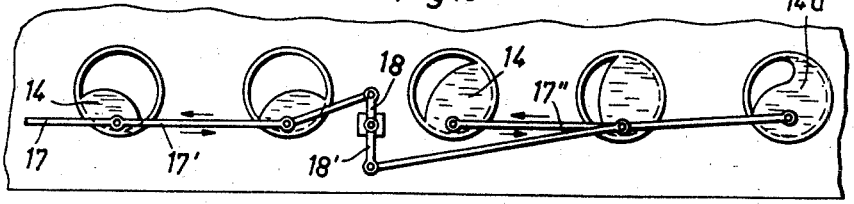

United States Patent Office 2,842,076
Patented July 8, 1958

2,842,076

APPARATUS FOR DISTRIBUTING COMBUSTION AIR INTO DIFFERENT COMBUSTION ZONES OF A FURNACE

Johannes Josef Martin, Munich, Germany

Application February 5, 1953, Serial No. 335,363

11 Claims. (Cl. 110—72)

The present invention relates to an apparatus for admitting and distributing combustion air into different combustion zones of a furnace.

When changing the output of conventional combustion apparatus, the fuel supply is changed and the admission of combustion air to individual combustion zones is changed by the stoker by resetting the throttle flaps or gates controlling the air supply to the different combustion zones. This manipulation is cumbersome and does not assure efficient operation. Local overheating of the furnace is unavoidable.

It has been proposed to link all throttle flaps and to include means in the linkage for actuating the gates for different combustion zones to a different extent. Such mechanisms are composed of a great number of parts and are complicated. They are suitable for only one type of fuel for which they have been constructed. A changeover to a different fuel requiring a different distribution of the combustion air into the different zones involves many mechanical changes and is expensive. To simplify the conventional mechanisms, they are usually constructed to answer only approximately the air requirements of the individual combustion zones or limit adjustability to only a part of the total load range.

It is an object of the present invention to provide an apparatus which permits simultaneous adjustment of the different ports admitting combustion air to the different combustion zones. The new apparatus is simple, inexpensive, and is suitable for any number of combustion zones. It assures admission of the correct amount of combustion air to each zone at all load conditions of the furnace and is readily adaptable to different fuels. According to the invention, the air admission opening for each combustion zone conforms with a curve obtained by plotting the amount of air admitted through the opening against the stroke or path of the member actuating the air admission gates. Throttling of the air is effected by slides or shutters movable adjacent to the air admission ports. Either the shutters or the ports covered thereby are provided with air passage control edges which may form part of readily removable inserts for defining the basic opening available for the admission of the combustion air.

Further and other objects of the present invention will be hereinafter set forth in the accompanying specification and claims, and shown in the drawing which, by way of illustration, shows what I now consider to be preferred embodiments of my invention.

In the drawing:

Fig. 1 is a diagrammatic front view of a conventional arrangement for simultaneous operation of a plurality of combustion air admission gates;

Fig. 2 is a horizontal sectional view of the device illustrated in Fig. 1;

Fig. 3 is a diagrammatic front view of a modified conventional apparatus for the control of combustion air admission to a plurality of individual combustion zones;

Fig. 4 is a diagram in which the amounts of air admitted to individual combustion zones are plotted against the path or stroke of the air control gates;

Fig. 5 is a diagrammatic illustration of three air admission ports and gates or shutters cooperating therewith, the latter having air flow openings of different configurations as defined by the curves shown in Fig. 4;

Fig. 6 is a diagrammatic illustration of three combustion air admission ports and gates or shutters cooperating therewith, the ports having a configuration corresponding to the curves shown in Fig. 5;

Fig. 7 is a diagrammatic illustration of three modified combustion air admission ports and shutters cooperating therewith;

Fig. 8 is a diagrammatic front view of a device according to the invention for admitting combustion air to three different combustion zones;

Fig. 9 is a diagrammatic front view of an air admission port provided with an insert according to the invention;

Fig. 10 is a diagrammatic front view of a modified port and insert according to the invention;

Fig. 11 is a diagrammatic front view of a further modification of a combustion air admission device according to the invention;

Fig. 12 is a diagrammatic front view of combustion air admission ports for three combustion zones, the ports having inserts provided with a mechanism for simultaneous control;

Fig. 13 shows a modified mechanism for simultaneous control of the inserts of a plurality of combustion air admission ports according to the invention.

Like parts are designated by like numerals in all figures of the drawing.

Figs. 1 and 2 illustrate a conventional mechanism for operating throttle slides 6 for controlling the air inlet openings 5 of an air box 4. The combustion air flows through the openings 5 into the individual furnace zones.

In the embodiment of the invention shown in Figs. 1 and 2, a crank 1 connected with a spur gear wheel 1a actuates a rack 2 which is connected with a rod 2a for moving the throttle slides 6 in the direction of the arrows shown below the rod 2a in Fig. 1.

Fig. 3 illustrates a conventional device comprising a crank mechanism 3 affording movement of throttle slides 6a on a circular path to control the extent of opening or closing of arcuated air ports 5a.

Figs. 1 to 3 merely serve to illustrate how the invention to be described below can be performed. Instead of conventional throttle flaps which are revolvable about an axis and which do not change the air flow in proportion to the angular movement of the flaps, the present invention is preferably applied to and is an improvement of conventional devices having throttle slides (6, 6a) which, in the conventional devices, effect air flow through ports covered by the slides in proportion to the displacement of the slides. Controlling the combustion air supply to furnaces in the aforedescribed conventional manner is unsatisfactory because, for example, when changing from full load to half load the air supply to some furnace zones must be reduced to one half whereas in other zones more than half and in a third zone less than one half of the air which is required for full load operation, must be supplied to assure efficient combustion.

With the device according to the invention each combustion zone has its own characteristic relation between the displacement of the air admission control slide and the amount of air flowing through the port controlled by the slide, which relation is based on combustion conditions in the zone supplied with air through the port. This relation is different for different combustion zones.

In the diagram, Fig. 4, characteristic relations 7, 7', and 7'' are plotted for three different combustion zones. The abscissae $x$ represent the slide displacement in percent of the total displacement and the ordinates $y$ represent the air flowing through the uncovered portions of the ports in percent of the maximum air flow. According to the invention, the air inlet openings of each individual zone are determined by the respective slide displacement-air flow relation curve 7, 7', or 7''.

The curves described supra, which are determined by the combustion conditions in the individual combustion zones, can be materialized by shaping the throttle slides or shutters 6 (or 6a) in accordance with the individual curves, for example by providing control edges 8, 8', 8'' (Fig. 5) of suitable configurations in the slides, the air inlet openings 5 covered by the slides having a regular, for example rectangular, quadratic, ellipsoidal, or circular configuration. As an alternative, all slides 6, 6a may have the same and a geometrically regular configuration and the individual air inlet openings 5, 5a may have a control edge having a configuration which effects an air distribution as prescribed by the curves 7, 7', 7'' (Fig. 6) or 8, 8', 8'' (Fig. 7) which are characteristic of the desired air distribution program. This can be effected by placing a suitably shaped insert or blind into the air inlet opening of each zone.

In a further modification of the device according to the invention, all air inlet openings 5b and all slides 6b covering same are circular, the latter being rigidly connected to a common actuating rod 2b (Fig. 8). A suitably shaped blind 14 is inserted in each air port to produce the desired curve 9, 9', 9'' which defines the relation between opening and air flow. The position of the inserts may be fixed by providing recesses in a frame 11 of the air port which recesses receive protuberances 10 of the inserts (Fig. 9).

As shown in Fig. 10, the inserts 14 may be revolvable in the air inlet ports, clamps 12 being provided on frames 11 for fixing the inserts in the desired position. Upon loosening of the clamps 12, the insert 14 can be rotated by an angle $\pm\alpha$.

As illustrated in Fig. 11, the insert may be rotatable about a central pin 15.

Rotatability of the inserts according to Figs. 10 and 11 is particularly useful, if adjustment is desired to cope with changing operating conditions.

Each insert may be provided with an individual actuating rod 16, or, as shown in Fig. 12, all inserts may be adjusted simultaneously by providing a common adjusting rod 16' for all inserts.

Adjustment of a group of inserts relatively to another group of inserts may be effected by means of a reversing linkage 17, 17', 18, 18', 17'' (Fig. 13), a two-arm lever 18, 18' effecting reverse actuation of the inserts of different groups. By making the arms 18 and 18' of different lengths, the kinematic conditions may be additionally modified. The connecting rods 17, 17', 17'' may be pivoted at different distances from the axes of rotation of the inserts, as shown on insert 14a, to produce different angular movements.

Adjustability of the position of the inserts permits adaptation of the air flow to the different air requirements of different fuels. With the mechanism according to the invention, a wide range of adjustment can be effected without changing the fundamental curve characteristics, the adjustment being continuous, i. e. producing no breaks in the curves, and involving no reduction of the air control range. The number of different insert configurations can be very limited, because they may be so designed that they can be reversed. Displacement of the circular throttle slides 6b may be effected by the mechanism shown in Fig. 3 instead of by that shown in Fig. 8.

The system according to the invention for the distribution of the forced-draught in furnaces having a plurality of air supply zones permits a completely automatic control of the combustion air from zero to full load, even with fuels having unfavorable combustion characteristics. The new system can be applied to any size of grate and number of combustion zones and permits immediate change-over to a fuel requiring different air supply to the individual zones.

While I believe the above described embodiments of my invention to be preferred embodiments, I wish it to be understood that I do not desire to be limited to the exact details of design and construction shown and described, for obvious modifications will occur to a person skilled in the art.

What is claimed is:

1. In a furnace having a plurality of combustion zones individually requiring different amounts of combustion air at different loads and at different fuels burnt in the furnace, a furnace wall extending along a plurality of combustion zones of the furnace, a plurality of adjustable air admission means associated with said wall for admitting combustion air from the outside into the individual combustion zones, and a mechanism operatively connected with said admission means for simultaneously adjusting said admission means, said air admission means individually including means determining the air flow area of said admission means and individually having a nonlinear air passage control edge whose configuration is different in different ones of the above admission means for differently changing the air flow area of the different air admission means upon simultaneous adjustment by said mechanism whereby at successive settings of said mechanism the character of the relative flows of air through the successive air admission means is changed.

2. In a furnace as defined in claim 1 and wherein said air admission means individually include an opening in said furnace wall, said means having a nonlinear control edge being in the form of a slide which is adjacent to and movable relatively to said opening, said mechanism being connected with a plurality of said slides, and said openings of all of said air admission means having the same size and configuration.

3. In a furnace as defined in claim 1 and wherein said means having a control edge are in the form of openings in said furnace wall, said air admission means individually including a slide which is adjacent to and movable relatively to the respective opening, said mechanism being connected with a plurality of said slides, and all said slides having the same configuration.

4. In a furnace having a plurality of combustion zones individually requiring different amounts of combustion air at different loads and at different fuels burnt in the furnace, a furnace wall extending along a plurality of combustion zones of the furnace, a plurality of openings in said wall for admitting combustion air from the outside into the individual combustion zones, inserts individually placed in said openings, said inserts individually having air inlet apertures individually including nonlinear control edges which are differently shaped in different inserts, shutter means placed adjacent to said apertures and being movable relatively to said inserts, all of said shutter means having the same configuration, and actuating means connected with said shutter means for simultaneously moving the latter relatively to said apertures, whereby at successive settings of said actuating means the character of the relative flows of air through the successive apertures is changed.

5. In a furnace according to claim 4 and wherein said inserts are individually movable in their respective openings for individually adjusting the positions of said apertures in said wall.

6. In a furnace according to claim 5, means for fixing said inserts in selected positions.

7. In a furnace according to claim 4 and wherein said openings in said furnace wall are circular, said inserts being also circular and revolvably fitted to said furnace wall.

8. In a furnace according to claim 4 and wherein said air inlet openings in said furnace wall are circular, said inserts being also circular and rotatable in said openings, means being operatively connected with said inserts for rotating said inserts.

9. In a furnace according to claim 8 and wherein a plurality of said means for rotating said inserts are interconnected for simultaneously rotating a plurality of said inserts.

10. In a furnace according to claim 8, first actuating means interconnecting a first group of said means for rotating said inserts for simultaneously rotating a first group of said inserts, second actuating means interconnecting a second group of said means for rotating said inserts for simultaneously rotating a second group of said inserts, and third means interconnecting said first and said second actuating means.

11. In a furnace according to claim 4 and wherein said air inlet openings in said furnace wall are circular, said inserts being also circular and rotatable in said openings, means pivoted to a plurality of said inserts for simultaneously rotating a plurality of said inserts, the pivot axes of said last mentioned means being at different distances from the axes of rotation of the different inserts.

References Cited in the file of this patent

UNITED STATES PATENTS

| | | |
|---|---|---|
| 510,587 | Coxe | Dec. 12, 1893 |
| 527,455 | Richards | Oct. 16, 1894 |
| 527,719 | Richards | Oct. 16, 1894 |
| 1,340,725 | Lloyd | May 18, 1920 |
| 1,473,731 | McKenzie | Nov. 13, 1923 |
| 1,655,246 | Schermuly | Jan. 3, 1928 |
| 1,863,541 | Lucke | June 14, 1932 |

FOREIGN PATENTS

| | | |
|---|---|---|
| 459,716 | Germany | May 11, 1928 |
| 130,314 | Great Britain | Oct. 16, 1919 |